United States Patent [19]
Pels

[11] Patent Number: 6,167,339
[45] Date of Patent: Dec. 26, 2000

[54] DRIVE SYSTEM FOR A VEHICLE AND METHOD FOR OPERATING A DRIVE SYSTEM

[75] Inventor: Thomas Pels, Achern, Germany

[73] Assignee: Continental ISAD Electronic Systems GmbH, Landsberg, Germany

[21] Appl. No.: 09/450,622

[22] Filed: Nov. 30, 1999

Related U.S. Application Data

[63] Continuation of application No. PCT/EP98/03211, May 29, 1998.

[30] Foreign Application Priority Data

May 30, 1997 [DE] Germany .......................... 197 22 808

[51] Int. Cl.$^7$ .............................. B60K 41/00; B60L 11/00
[52] U.S. Cl. ................................................. 701/54; 701/61
[58] Field of Search .................................. 701/54, 55, 56, 701/61, 101, 104; 477/37, 39, 43, 54

[56] References Cited

U.S. PATENT DOCUMENTS

| | | | |
|---|---|---|---|
| 4,194,608 | 3/1980 | Usui et al. | 192/0.092 |
| 4,414,937 | 11/1983 | Ueda et al. | 123/198 |
| 4,866,622 | 9/1989 | Dreher et al. | 364/431.04 |
| 5,168,975 | 12/1992 | Bernhardt et al. | 192/0.096 |
| 5,327,992 | 7/1994 | Boll | 180/65.2 |
| 5,495,912 | 3/1996 | Gray, Jr. et al. | 180/165 |
| 5,501,644 | 3/1996 | Zhang | 477/97 |
| 5,507,705 | 4/1996 | Hara | 477/408 |
| 5,722,911 | 3/1998 | Ibaraki et al. | 477/3 |
| 5,788,004 | 8/1998 | Friedmann et al. | 180/65.2 |
| 5,789,882 | 8/1998 | Ibaraki et al. | 318/148 |
| 5,841,201 | 11/1998 | Tabata et al. | 290/40 C |
| 5,980,414 | 11/1999 | Larkin | 475/211 |
| 6,007,443 | 12/1999 | Onimaru et al. | 475/5 |

FOREIGN PATENT DOCUMENTS

| | | |
|---|---|---|
| 05 56 477 A1 | 8/1993 | European Pat. Off. . |
| 05 54 544 B1 | 5/1995 | European Pat. Off. . |
| 0 759 370 | 2/1997 | European Pat. Off. . |
| 21 17 256 | 2/1983 | Germany . |
| 35 26 671 A1 | 1/1987 | Germany . |
| 32 12 843 | 7/1988 | Germany . |
| 41 34 268 A1 | 4/1992 | Germany . |
| 42 00 806 C1 | 1/1993 | Germany . |

(List continued on next page.)

OTHER PUBLICATIONS

PCT *International Search Report* dated Nov. 11, 1998 regarding PCT Patent Application Serial No. PCT/EP98/03211.

Kraftfahrtechnisches Taschenbuch/Bosch, 21. Auflage, 1991, pp. 322–232 and pp. 550–551. (month not available).

Voβ, Burghard: Bedarfsorientierte Nebenaggregate (Demand–oriented operation of vehicle auxiliaries), in ATZ Automobiltechnische Zeitschrift 94, 1991, 12, p 644–648 (German with English abstract). (month not available).

Bumpy, JR and Forster, I: Optimisation and control of a hybrid electric car, in I.E.E. Proceedings–D/Control Theory and Applications, 134 No. 6, Part D, 1987, p. 373–387. (English). (month not available).

*Primary Examiner*—Tan Nguyen
*Attorney, Agent, or Firm*—Marshall, O'Toole, Gerstein, Murray & Borun

[57] ABSTRACT

The invention concerns a drive system, especially for a vehicle, with a drive unit, especially an internal combustion engine, a transmission with variable transmission ratio between drive unit and drive, and especially with a continuously variable transmission ratio or one variable in fine gradations, at least one additional unit driven by the drive unit, especially an electric generator, a control, which selects the transmission ratio within a range of possible transmission ratios, so that the highest possible efficiency is achieved with joint consideration of the individual efficiency functions of the vehicle drive and the additional unit(s) and their drive, in which the individual efficiency functions are incorporated in the total efficiency with a weight corresponding to the power fraction of the vehicle drive and additional unit(s). The invention is also geared toward a corresponding method.

17 Claims, 4 Drawing Sheets

FOREIGN PATENT DOCUMENTS

| | | |
|---|---|---|
| 42 17 668 | 5/1993 | Germany . |
| 42 05 770 | 8/1993 | Germany . |
| 43 04 153 A1 | 8/1993 | Germany . |
| 43 44 053 | 7/1994 | Germany . |
| 43 29 978 A1 | 3/1995 | Germany . |
| 195 13 629 | 10/1995 | Germany . |
| 0 694 686 | 1/1996 | Germany . |
| 195 05 431 A1 | 8/1996 | Germany . |

DRIVE SYSTEM FOR A VEHICLE AND METHOD FOR OPERATING A DRIVE SYSTEM

RELATED APPLICATION

This patent is a continuation of International Patent Application Ser. No. PCT/EP98/03211 which was filed on May 29, 1998.

FIELD OF THE INVENTION

The invention concerns a drive system, especially for a vehicle, as well as a method for operating such a drive system.

BACKGROUND OF THE INVENTION

Present internal combustion engines are generally equipped with internal combustion engines that have relatively high power reserves. This means that the engines run most of their operating time with relatively low torque or, expressed differently, with relatively low effective average pressure. The relative consumption (i.e., the consumption normalized to engine torque), however, generally has its global optimum at a relatively high effective average pressure, and then exhibits only a relatively limited dependence on engine torque over a relatively broad range of average engine speed.

It is known that low-speed driving in a higher gear generally leads to a reduction in fuel consumption. The reason for this is that at lower engine speed, but constant engine power, the delivered torque and thus the relative effective average pressure is generally greater, which shifts the operating point into more favorable consumption characteristic regions (cf., for example, Kraftfahrtechnisches Taschenbuch/Bosch, $21^{st}$ Edition, 1991, pages 322–323). The consumption can likewise generally be favorably influenced in automatic transmissions by selecting the switching points at low speeds.

With continuous transmissions (so-called CVT transmissions, in English "Continuous Velocity Transmission") or finely graded transmissions, these fundamental ideas can be used more effectively. In fact, the possibility of (quasi) continuous adjustment of transmission permits selection of the operating point, so that the consumption is minimal for the corresponding engine power (cf., for example, Karftftechnisches Taschenbuch, loc. cit., pages 550–551). In practice, however, there are often boundary conditions that restrict the range of possible transmission ratios and therefore do not permit, strictly speaking, achievement of the theoretically possible consumption minimum at a corresponding power. Consumption optimization then consists of selecting the operating point within the range of possible transmission ratios, so that the practically possible consumption minimum is achieved. One such boundary condition, for example, can be a transmission ratio limit stipulated by the transmission by design, say, when an "overdrive transmission" (i.e., transmission ratio of smaller than one), often not present in a transmission, would be necessary at smaller delivered power to achieve the theoretical consumption minimum. Another such boundary condition can lie in the fact that a certain acceleration excess can be desired, even in a continuous (or finely graded) transmission. This is understood to mean the distance of the torque at the operating point from the maximum torque.

Another proposal to shift the operating point as close as possible to the global consumption optimum (in a hybrid vehicle here) is known from DE 43 44 053 A1. The concept is not based on increasing the torque by reducing the speed at constant power, but by increasing the power demanded by the internal combustion engine. The excess power not required to drive the vehicle is converted to electrical power by a generator driven by the internal combustion engine and stored in an electrochemical energy accumulator. The stored energy is reused during electric drive of the vehicle.

It is known from DE 195 05 431 A1 that the total efficiency in a hybrid vehicle can be optimized, this being calculated by a product of internal combustion engine, generator and battery efficiency. It is mentioned in the document that a speed adjustment by means of a CVT transmission is also possible as so-called "efficiency-influencing parameter".

EXEMPLARY ADVANTAGES AND OBJECTS OF THE INVENTION

The underlying task of the present invention is to offer an additional drive system with which lower fuel consumption can be achieved. It also includes the provision of a corresponding method.

The inventors of the present invention recognized that in modern vehicles driven directly by an internal combustion engine, as usual, the power take-off by simultaneously running additional units (especially the generator) is noticeably large relative to the drive power in many operating states (for example, in city traffic). With this as point of departure, the invention teaches optimization of total efficiency to achieve the highest possible efficiency, which includes the individual efficiencies of the vehicle drive and the simultaneously running additional units, with a weight corresponding to their power fraction.

In particular, a first aspect of the invention offers a drive system, especially for a vehicle, which comprises the following: a drive unit, especially an internal combustion engine, a transmission with variable transmission ratio between the drive unit and drive, and especially with a continuously variable transmission ratio or one variable in fine gradations, at least one additional unit driven by the drive unit, especially an electric generator, a control that selects the transmission ratio within a range of possible transmission ratios, so that the greatest possible total efficiency is achieved with joint consideration of the individual efficiency functions of the vehicle drive and the additional unit(s) and their drive, in which the individual efficiency functions are incorporated in the total efficiency with a weight corresponding to the power fraction of the vehicle drive and the additional unit(s). The transmission can also be an automatic transmission or an automated manual transmission. Individual efficiency function is understood to mean the efficiency of the vehicle drive (formed by the internal combustion engine and drive train) or of an additional unit drive (formed by the internal combustion engine and additional unit as a function of the speed or a quantity connected with it).

In some embodiments, the internal combustion engine and additional unit are coupled to each other with a fixed speed ratio. In an alternative embodiment, in contrast, the speed ratio between the internal combustion engine and additional unit is variable. This additional degree of freedom, on the one hand, permits even further efficiency optimization, but, on the other hand, causes an additional design expense.

Returning to the advantageous fixed speed ratio, in some embodiments this has a value of one with particular advantage. The auxiliary unit then rotates with the same speed as the internal combustion engine. For example, this is the case in a particularly advantageous single-shaft unit in which the rotor of the generator sits directly on the driveshaft of the internal combustion engine and rotates with it (firmly connected or connectable to it).

In some embodiments, the total efficiency is determined as the power-weighted sum of the individual efficiency functions, these again being determined as a product of the efficiencies of elements connected in series, i.e., internal combustion engine and drive train or internal combustion engine and additional unit. In another advantageous embodiment, the relative weights of the individual efficiency functions (in each case referred to a specific speed of the internal combustion engine) are fixed; in fact, they are chosen (as a function of speed) in relation to the average relative powers of the drive and additional unit(s) at the corresponding speed occurring during operation, for example, proportional to the average relative powers at the corresponding speed. Another embodiment is particularly advantageous, in which the relative weights of the individual efficiency functions are not fixed, but are variable, in addition to the possible dependence on speed mentioned above. The variable relative weights of the individual efficiency functions are chosen as a function of the instantaneous relative powers of the drive and auxiliary unit(s), for example, proportional to the instantaneous relative powers.

As mentioned above, the individual efficiency functions of the internal combustion engine and additional unit(s) generally exhibit a different speed dependence at constant power. If one were to optimize the individual efficiency functions only in themselves, the optima of the individual efficiencies would be obtained at different speeds. Optimization of the total efficiency at fixed speed ratio then generally leads to the result that the speed at which the total efficiency becomes optimal lies between the speed values of the individual efficiency optima. The greater the weight of an individual efficiency function, the closer the speed of the total efficiency optimum lies to the speed of the optimum of this individual efficiency function.

If the speed is changed, this generally leads to a change in total power, because of the then altered individual efficiencies. In some embodiments, the change in total power resulting from optimization of the total efficiency is therefore considered by an iterative approach to the optimal total efficiency and the desired total power. The total power is brought to the desired value by changing the speed and the speed is then set again corresponding to the optimal total efficiency, and so forth.

Other features and advantages are inherent in the disclosed apparatus or will become apparent to those skilled in the art from the following detailed description and its accompanying drawings.

DESCRIPTION OF THE PREFERRED EMBODIMENTS

Figure 1:
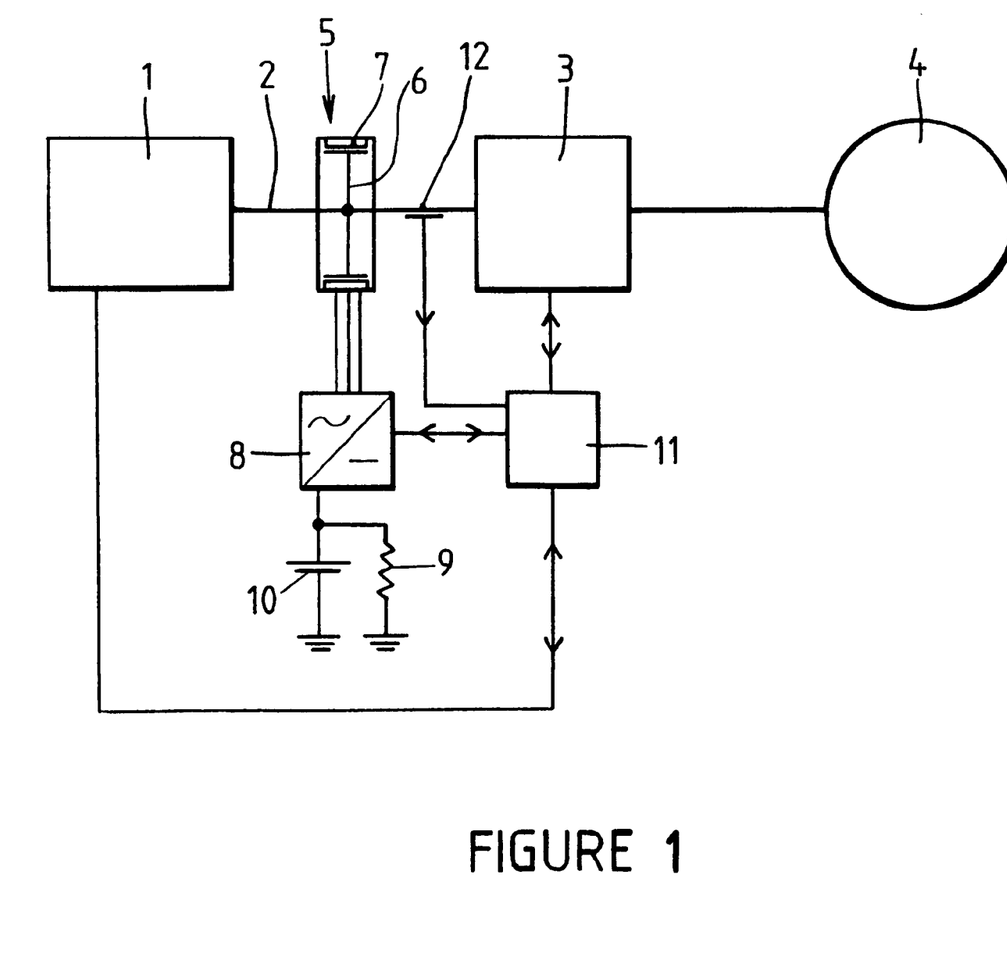
FIG. 1 shows a schematic view of a drive system of a vehicle.

A drive system of a vehicle, for example, a passenger car, according to FIG. 1 has an internal combustion engine 1, which delivers torque via a driveshaft 2 (for example, the crankshaft of the internal combustion engine 1), a CVT transmission 3 (i.e., a transmission with continuously variable transmission ratio) and optionally additional (not shown) parts of a drive train to drive wheels 4 of the vehicle. The CVT transmission 3, for example, is a sliding-element chain drive or other traction mechanism drive, like a V-belt. The continuous transmission ratio change can occur, for example, by an axial shift of the chain or of the other traction mechanism to two oppositely conical discs. In other variants the transmission ratio of the CVT transmission is not continuous, but variable in fine gradations. A clutch (not shown) can be provided as a separate component between internal combustion engine 1 and CVT transmission 3 or integrated in the latter.

An additional unit, here in the form of an electric generator 5, is driven by internal combustion engine 1. An electric machine is involved in the practical example shown, whose rotor 6 sits on the driveshaft 2 between internal combustion engine 1 and CVT transmission 3 and is coupled or can be coupled to rotate in unison with it. The speed ratio between internal combustion engine 1 and generator 5 is fixed and, in fact, it has the value 1, since the rotor 6 rotates together with driveshaft 2 (here the crankshaft of the internal combustion engine 1). In other variants (not shown) generator 5 is not arranged in the continuous drive train, but in a parallel drive branch, which permits switching of a transmission with fixed or variable transmission ratio, and especially an (additional) continuously variable transmission ratio or one variable in fine gradations. In addition to generator 5, other (electrical and/or mechanical) additional units can be provided.

The generator 5 can be an ordinary three-phase generator with downline rectifier unit. However, it is advantageously formed by an inverter-controlled three-phase machine that can be operated both as a motor and generator. Such a machine can assume, in addition to the braking functions like the generator effect or electric vehicle brake, driving functions, say, to start the internal combustion engine and for its support during vehicle acceleration. Moreover, an operating mode with rapidly alternating braking and driving torques is possible with such a machine, with which torque irregularities of the internal combustion engine are dampened. The machine, designed as an asynchronous three-phase machine 5, generates torques between rotor 6 and a stator 7 supported on the housing of the internal combustion engine 1. Supply of the winding (not shown) of stator 7 occurs through an inverter 8 with electric currents and voltages of almost freely adjustable amplitude, phase and frequency. The motor operating mode of electric machine 5 differs from the generator mode essentially by the sign of the slip between the magnetic rotating field and rotor 6, which is positive in the first case and negative in the second.

Inverter 8 is a DC-intermediate circuit-inverter, which cuts out sinusoidal width-modulated pulses from an essentially constant intermediate circuit direct current by means of electronic switches, and the pulses lead to almost sinusoidal currents of the desired frequency, amplitude and phase, averaged by the inductance of the electric machine 5, or converts corresponding AC currents to DC-like currents. In generator operation, the electric machine 5 delivers electrical power through inverter 8 to a vehicle electrical system, which has electrical consumers 9 and a vehicle battery 10. The latter is designed as a starter battery and can therefore deliver the energy and power ordinarily required for starting to electric machine 5 via inverter 8. In other variants, the battery is capable of storing and releasing larger amounts of energy or power.

A control device 11 serves to control the CVT transmission 3 and (in the depicted variant) generator 5 (via inverter 8) and internal combustion engine 1. In other variants (not shown), separate control devices that communicate with each other are provided for these different functions. The control device 11 stipulates to the CVT transmission 3 in each operating state which transmission ratio this must set. The control device 11 for this purpose receives as input information the instantaneous torque of internal combustion engine 1 (for example, by means of a torque measurement device 12), the power delivered instantaneously by the internal combustion engine 1 and/or the torque delivered by it (for example, with reference to the instantaneous throttle valve setting, the fuel injection amount and/or the directly measured torque, for example, by means of a torque hub lying in driveshaft 2), and the instantaneous generator power (for example, with reference to corresponding electrical quantities, like averaged currents and voltages of inverter 8). As further explained below, the control device 11 determines, by means of this information, the transmission ratio that makes the total efficiency of internal combustion engine 1 and generator 5 as large as possible. To perform this and additional extensive control tasks, it is equipped with a high-performance processor, in addition to memories that are designed, among other things, to permanently store extensive maps.

Figure 2:
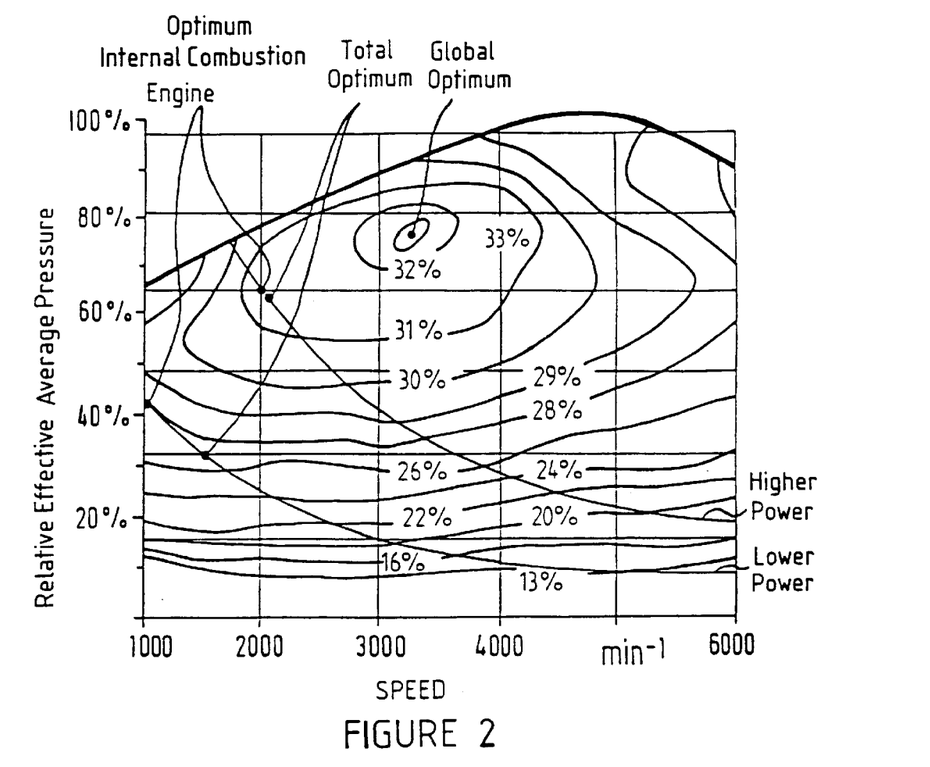
FIG. 2 shows an efficiency map of an internal combustion engine.

FIG. 2 shows an efficiency map of an internal combustion engine. Lines of equal efficiency $\eta_v$, are shown as a function of relative effective average pressure and speed. The efficiency $\eta_v$ is defined as the ratio of work delivered outward on the internal combustion engine to the mechanical equivalent of work of the supplied fuel. The individual efficiency function of the drive introduced further below is the product of the internal combustion engine efficiency and the efficiency of the drive train, $\eta_v \eta_a$. In the map according to FIG. 2, the greatest internal combustion engine efficiency $\eta_v$ lies overall at a relative effective average pressure (hereafter called "average pressure" for short) of about 75% and a speed of about 3300 rpm. From there, the efficiency drops off to all sides. Figuratively speaking, the map has the shape of a mountain; the lines of equal efficiency represent contour lines in this figure. The average pressure is proportional to the torque delivered by the internal combustion engine. Two curves of constant power are marked in the map, one of which with "higher power" and the other with "lower power". These are hyperbolas. Figuratively speaking, these curves are paths on the slope of the mountain. The highest point that such a path assumes represents the efficiency optimum of the internal combustion engine at the given power. For the hyperbola "higher power" this optimum lies at a speed of about 2000 rpm. The relative efficiency there is about 31%. On the hyperbola "lower power" the consumption optimum lies at a speed of 1000 rpm; it amounts to about 28% there. As can be gathered from FIG. 2, an even higher relative efficiency (about 29%) would theoretically be attainable in the latter hyperbola at lower speed. However, the speed of 1000 rpm in the depicted example is the lower speed limit, in order to guarantee reliable turning of the internal combustion engine. In a known drive system with a CVT transmission in the prior art, as mentioned at the outset, its transmission ratio is chosen so that the relative efficiency of the internal combustion engine is maximum. This means, in the case of the hyperbola of "higher power", the transmission ratio would be chosen in the prior art so that the internal combustion engine runs at a speed of 2000 rpm and, in the hyperbola of "lower power", at a speed of 1000 rpm.

Figure 3:
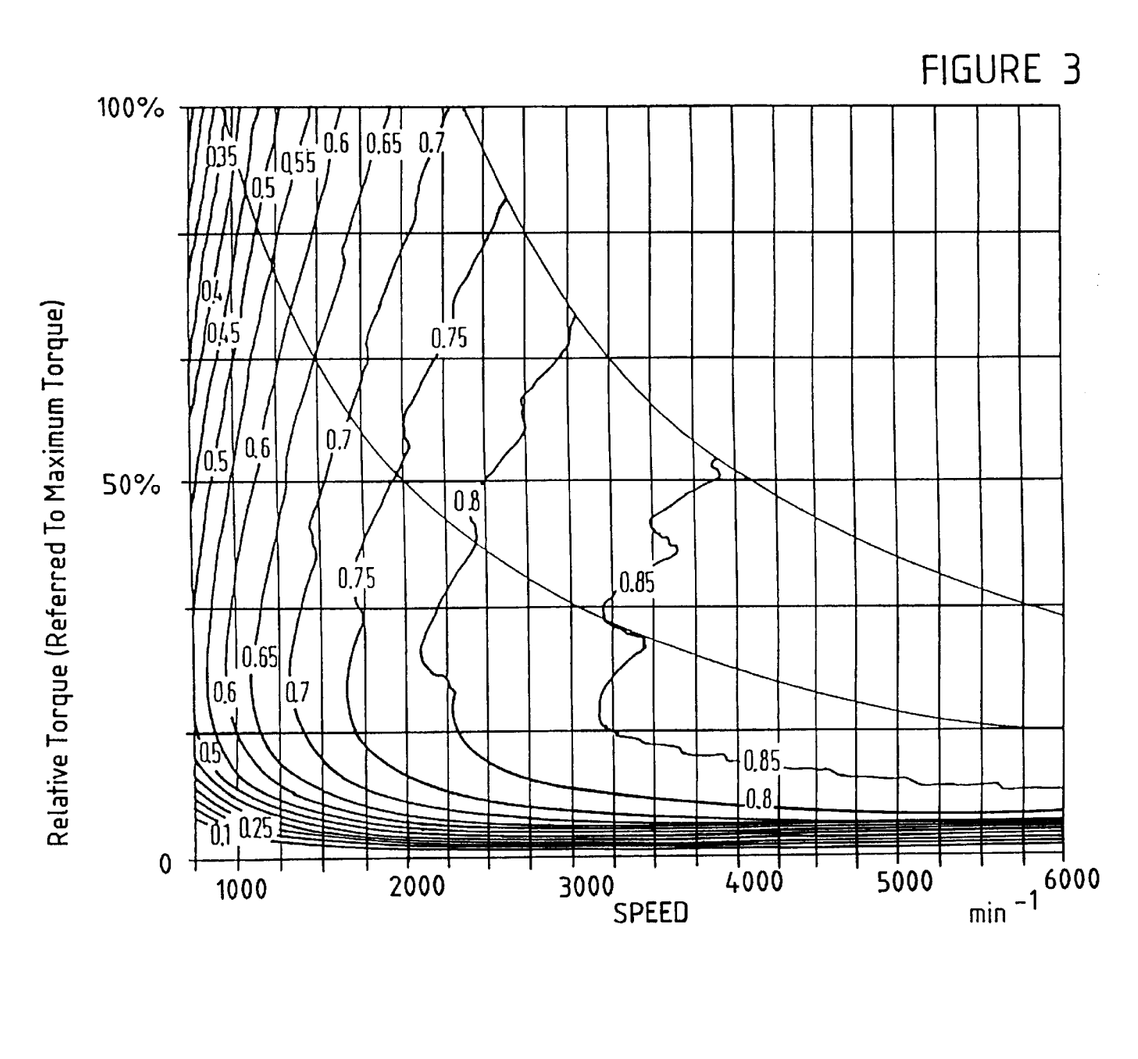
FIG. 3 shows an example of an efficiency map of a generator.

In the present example that serves to explain the invention, on the other hand, the additional unit or units are included in the efficiency optimization, here generator 5. This leads to a distinct shift in operating point and an increase in total efficiency relative to ordinary optimization, especially at low internal combustion engine powers. For this purpose, the efficiency map of generator 5 according to FIG. 3 is first shown. Similarly to FIG. 2, lines of equal efficiency are shown here as a function of relative maximum torque of the generator and speed. The "efficiency" $\eta_G$ of the generator is defined as the ratio of electrical power delivered by the generator to the mechanical energy equivalent (i.e., work) required to drive it. The map of generator 5, figuratively speaking, has the shape of a high plateau that drops off steeply at low speeds and low torques. A curve (hyperbola) of constant generator power is drawn in FIG. 3.

Figure 4:
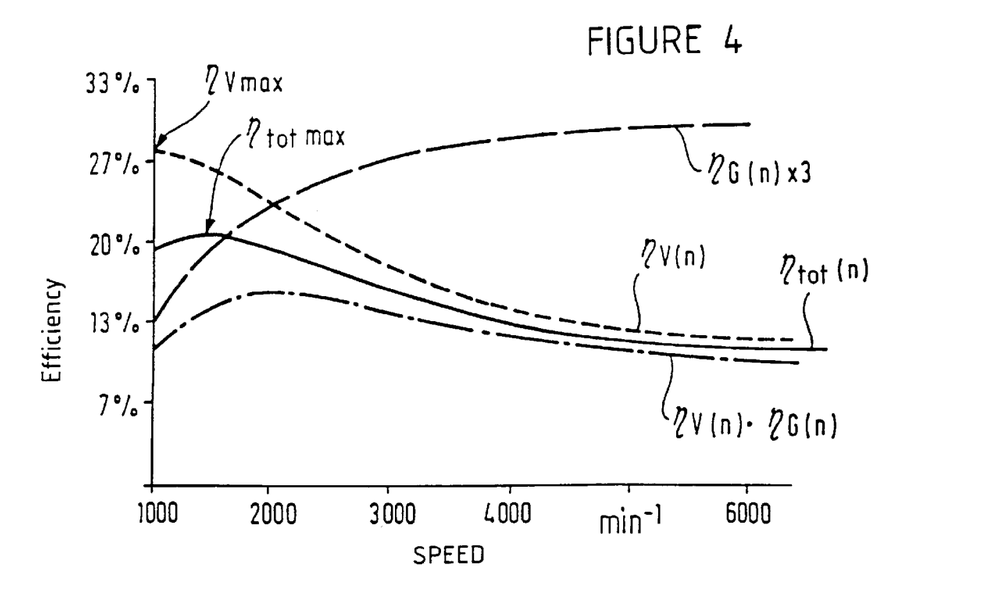
FIG. 4 shows a schematic view of the functional dependence of different efficiencies on the speed at a specified power distribution.

The "lower power" curve from the internal combustion engine map according to FIG. 2, as well as the power curve from the generator map according to FIG. 3 are shown together in FIG. 4 as a function of speed (in order to be able to show the numerically larger generator efficiency $\eta_G$ in the same diagram, the $\eta_G$ values are reduced to a third). The internal combustion engine efficiency $\eta_v$, as mentioned above, has its maximum at lower speed and drops off at higher speeds. The generator efficiency $\eta_G$ on the other hand, has its minimum at lower speed and rises at higher speeds. The individual efficiency function of the vehicle drive is initially equated approximately to the internal combustion engine efficiency $\eta_v(n)$, since the efficiency of the drive train $\eta_a$ lies relatively close to 1. The individual efficiency function for current generation by the generator is the product of the internal combustion engine and generator efficiency $\eta_v(n) \eta_G(n)$, since the internal combustion engine and generator are connected in series for current generation. The generator individual efficiency function is also shown in FIG. 4. Optimization of the total efficiency $\eta_{tot}$ can be explained by a power-weighted addition of the individual efficiency functions of the drive and current generation and subsequent determination of the maximum of the so obtained total efficiency function: initially, the efficiency weights $1_A$ and $1_B$ of the drive and current generation are determined and are obtained in an approximation from the relative powers $L_A$ and $L_B$ that the internal combustion engine 1 delivers for the drive or current generation:

$$1_A = L_A/(L_A + L_B), \text{ and}$$

$$1_B = L_B/(L_A + L_B).$$

The sum of the weights is one.

In a simple example the power of the internal combustion engine for the drive is 5 kW and for the generator 5 kW. This means the power delivered by the internal combustion engine is divided in roughly equal parts into the vehicle drive power and the generator drive power, which often occurs during operation of a modern vehicle, for example, in city traffic. This means:

$$1_A = \tfrac{1}{2}, \text{ and } 1_B = \tfrac{1}{2}.$$

The total efficiency $\eta_{tot}$, also shown in FIG. 4 as a function of speed n, is obtained as the sum of the power-weighted individual efficiency functions:

$$\eta_{tot}(n)=1_A\eta_v(n)+1_B\eta_v(n)\eta_G(n).$$

The optimal total efficiency, which is selected by the control device 11 by choosing a corresponding transmission ratio of the CVT transmission 3, lies in the maximum of the total efficiency function $\eta_{tot}(n)$. The total efficiency optimum is shown in FIG. 4; it lies at the location of the disappearing slope of the generator efficiency or, expressed analytically, at that speed at which the first derivative of the total efficiency function, with respect to speed, is the same and the second derivative is less than zero: $\eta_{tot\ max}=\eta_{tot}(n_0)$, in which $n_0$ is the speed for which the following applies:

$d\eta_{tot}/dn=0$, as well as $d^2\eta_{tot}/dn^2<0$.

If these conditions are met by several total efficiencies (local total efficiency optima), the optimal total efficiency is the maximum local optimum.

The optimal total efficiency in the example depicted in FIG. 4 lies at a speed of about 1500 rpm; it is about 20%. During consumption optimization of the internal combustion engine known in the prior art, on the other hand, as mentioned above, a speed of 1000 rpm, considered optimal, would be chosen, at which the total efficiency is only about 19%. Optimization of the total efficiency according to the invention in the present example therefore provides a relative efficiency improvement of about 5%. The distinct shift in operating point during optimization of total efficiency relative to the ordinary optimization is shown in FIG. 2. This operating point shift in the "lower power" curve is significant, but, on the other hand, is less important in the "higher power" curve, as can be gathered from FIG. 2. The reasons for this, on the one hand, are the lower weight of the generator efficiency and the shift of internal combustion engine efficiency maximum to greater speeds (here, for example, to 2000 rpm).

Several aspects should still be mentioned:

i) A generalization to several additional units is simply obtained when these are incorporated in the total efficiency with corresponding weights. Assume, for example, that the internal combustion engine mechanically drives an air conditioning compressor as additional unit, in addition to the generator. This air conditioning compressor has the efficiency $\eta_K(n)$ and the power weight $1_K$. Since the internal combustion engine and air conditioning compressor are connected in series (as regards the air conditioning compressor drive), the individual efficiency function of the air conditioning compressor drive is $1_K\eta_v(n)\ \eta_K(n)$. The total efficiency $\eta_{tot}$ as a function of speed n is obtained as the sum of the power-weighted individual efficiency functions:

$$\eta_{tot}(n)=1_A\eta_v(n)+1_K\eta_v(n)\eta_G(n)+1_K\eta_v(n)\eta_K(n).$$

Generalization to additional or other units occurs accordingly by summing the individual efficiency functions formed in corresponding fashion.

ii) The individual efficiency function of the vehicle drive mentioned above in several places is based on the approximation that only the internal combustion engine efficiency $\eta_v$ is decisive for it. However, strictly speaking, the efficiency $\eta_A$ of the drive train that transfers the internal combustion engine power must also be considered. The corresponding precise individual efficiency function for the vehicle drive is again a product $\eta_v(n)\eta_A(n)$, since the internal combustion engine and drive train are connected in series. The total efficiency therefore is:

$$\eta_{tot}(n)=1_A\eta_v(n)\eta_A(n)+1_B\eta_v(n)\eta_G(n).$$

iii) For determination of the power weights the powers delivered at the outset (i.e., the power delivered by the drive wheels and by the generator) must not be used as a basis, but the sharing of initial powers (i.e., sharing of the mechanical equivalent of supplied fuel). However, since the power flow is only shared after the internal combustion engine, the same result is obtained if sharing of the power delivered by the internal combustion engine is used as a basis in calculating the weights.

iv) For easier understanding the above presentation is based on the assumption that the power of the internal combustion engine remains constant during optimization, i.e., the operating point can only move on a power hyperbola (as shown in FIG. 2). Strictly speaking, however, a variation of generator efficiency entails a change in internal combustion engine power, since at low generator efficiency, the internal combustion engine must deliver greater power than at higher generator efficiency, so that the generator in each case delivers the desired (constant) initial power. As a result of this, when the delivered total power is kept constant as boundary condition, the operating point of the internal combustion engine during a speed variation does not remain strictly on a hyperbola of constant power, and the weights $1_A$ and $1_B$ also vary with speed. The effects of these additional speed dependences on position of the total efficiency optimum, however, are relatively small. They can therefore be ignored or accounted for approximately by (experimentally determined) correction functions. There is also a possibility of iteratively approaching the total efficiency optimum (for example, by means of regulation).

v) The present discussion refers for simplification to static operation (i.e., to states of constant total and generator power); optimization of the total efficiency in the present sense is also advantageous during state changes, i.e., in dynamic operation.

Figure 5:
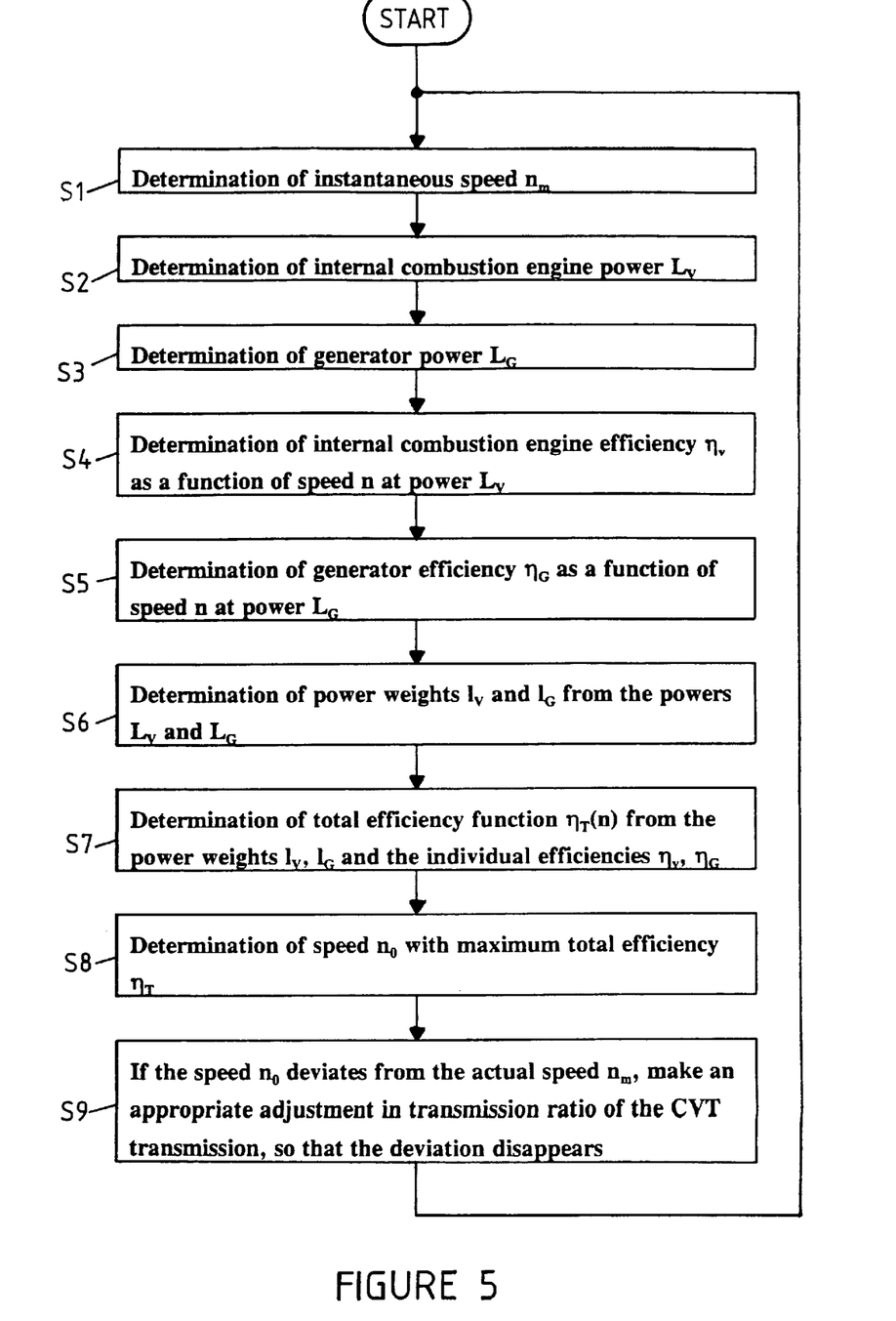
FIG. 5 shows a schematic flowchart of a method for operating the drive system of FIG. 1.

Finally, FIG. 5 shows an example of how the method for optimization of total efficiency runs in a drive system according to FIG. 1. The control device 11 initially determines in step S1 the instantaneous speed $n_m$ by means of a speed measurement device 12. In the next step S2 it determines, by means of engine operational data (for example, throttle valve setting, fuel injection amount), as well as the previously determined speed, the power $L_v$ instantaneously delivered by the internal combustion engine 1. In step S3 it then determines, with reference to electrical characteristics of the inverter 8 (for example, current and voltage on the DC side of the inverter), the instantaneous power $L_G$ of generator 5. In step S4 the control unit 11 determines the internal combustion engine efficiency $\eta_v$ with reference to the stored maps, as a function of speed n at the instantaneous internal combustion engine power $L_v$. Accordingly, in step S5 it determines, again from stored maps, the generator efficiency $\eta_G$ as a function of speed n at the instantaneous generator power $L_G$. It calculates in step S6 approximately, from the power $L_v$ and $L_G$, how the power of the internal combustion engine is shared in vehicle operation and current generation and sets the power and efficiency weights $1_A$ and $1_B$ accordingly. In step S7 it obtains from the power weights $1_A$ and $1_B$ in the individual efficiencies $\eta_v$, $\eta_G$ the total efficiency $\eta_T$ as a function of speed n. In step S8 it determines the speed no at which the total efficiency $\eta_T$ is maximum. If this speed deviates from the actual speed $n_m$ determined in step S1, it causes an appropriate adjustment in step S9 of the transmission ratio of CVT transmission 3, so that the actual speed assumes the optimum value $n_0$ for total efficiency. By an appropriate change of control devices of internal combustion engine 1 (for example, throttle valve and/or fuel injection amount and/or ignition point), the control unit 11 achieves a situation in which the engine power $L_v$ remains essentially constant, despite the speed change. Accordingly, by changing the electrical operating parameters of generator 5 (for example, the amplitude and/or phases of the voltages/currents), it causes this to deliver power $L_G$ essentially unchanged, despite the altered speed. Steps S1 to S9 run in succession uninterrupted, in order to permit the drive system to immediately adjust to the altered situation during speed or power changes. Individual or all of the steps S4 to S8 can naturally be skipped when the power and speed values remain unchanged, since the results require no change relative to the preceding run. Moreover, the stated sequence of steps S1 to S9 can be modified, for example, the power weights can be determined immediately after step S3, or the individual efficiencies can be determined in steps S4 and S5 directly after determination of the corresponding power (in steps S2 and S3).

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. For use with a vehicle having wheels and a drive train, a drive system comprising:
    an internal combustion engine;
    a transmission located between the internal combustion engine and the wheels of the vehicle, the transmission having one of a continuous and finely graded variable transmission ratio;
    an electric generator; and
    at least one control device in communication with the transmission for selecting the transmission ratio within a range of possible transmission ratios to optimize the total efficiency of the internal combustion engine and the electric generator, wherein the control device optimizes the total efficiency by considering an efficiency of each of: (a) a combination of the internal combustion engine and the drive train, and (b) a combination of the internal combustion engine and the electric generator, at least as a function of speed, and wherein the efficiencies of: (a) the combination of the internal combustion engine and the drive train and (b) the combination of the internal combustion engine and the electric generator are weighted for purposes of the optimization based upon power fractions associated with driving the vehicle and driving the electric generator, the power fractions being referenced to a total power released by the internal combustion engine.

2. A drive system as defined in claim 1, wherein a fixed speed ratio prevails between the internal combustion engine and the electric generator at least during efficiency optimization.

3. A drive system as defined in claim 2, wherein the fixed speed ratio has a value of approximately 1.

4. A drive system as defined in claim 1, wherein the efficiencies of the combination of the internal combustion engine and the drive train and the combination of the internal combustion engine and the electric generator are determined as a product of the efficiencies of the internal combustion engine and the drive train and a product of the efficiencies of the internal combustion engine and the electric generator respectively.

5. A drive system as defined in claim 1, wherein the power fractions associated with driving the vehicle and driving the electric generator are treated as variable as a function of the speed of the internal combustion engine and corresponding to average relative powers for driving the vehicle and the electric generator at the respective speed.

6. A drive system as defined in claim 1, wherein the power fractions associated with driving the vehicle and driving the electric generator are treated as variable as a function of instantaneous relative powers for driving the vehicle and the electric generator at the respective speed.

7. A drive system as defined in claim 1, wherein a speed ratio between the internal combustion engine and the electric generator is variable in one of continuous and finely graded fashion, and the control device selects the speed ratio within a range of possible ratio values so that the highest possible total efficiency is achieved.

8. A drive system as defined in claim 1 wherein the control device considers a change in total power resulting from optimization of the total efficiency by iteratively evaluating the optimal total efficiency and the desired total power.

9. A drive system as defined in claim 1, further comprising at least one additional unit driven by the internal combustion engine, wherein the control device optimizes the total efficiency by also considering an efficiency of the at least one additional unit, and wherein the efficiency of the at least one additional unit is weighted for purposes of the optimization based upon power fractions associated with driving the vehicle, the electric generator, and the at least one additional unit.

10. A drive system as defined in claim 9 wherein the at least one additional unit comprises an air conditioner compressor.

11. For use with a vehicle having and internal combustion engine, an electric generator and a transmission, the transmission having one of a continuous and finely graded variable transmission ratio, a method comprising the steps of:
    determining an instantaneous speed of the internal combustion engine;
    determining power generated by the internal combustion engine;
    determining power generated by the electric generator;
    determining an efficiency of the internal combustion engine by reference to the instantaneous speed and the power of the internal combustion engine;
    determining an efficiency of the electric generator by reference to the instantaneous speed of the internal combustion engine and the power of the electric generator;
    determining a first power weight associated with the power of the internal combustion engine and a second power weight associated with the power of the electric generator;
    determining a total efficiency function based upon the first power weight, the second power weight, the efficiency of the internal combustion engine and the efficiency of the electric generator;
    based on the total efficiency function, identifying a target speed at which the total efficiency is maximized; and if the target speed is different from the instantaneous speed of the internal combustion engine, adjusting the transmission ratio of the transmission to at least substantially eliminate the difference.

12. For use with a vehicle having wheels and a drive train, a drive system comprising:

an internal combustion engine;

a transmission located between the internal combustion engine and the wheels of the vehicle, the transmission having one of a continuous and finely graded variable transmission ratio;

an electric generator; and at least one control device in communication with the transmission for selecting the transmission ratio within a range of possible transmission ratios to optimize the total efficiency of the internal combustion engine and the electric generator, wherein the control device optimizes the total efficiency by considering an efficiency of each of: (a) the internal combustion engine, and (b) the electric generator at least as a function of speed, and wherein the efficiencies of the internal combustion engine and the electric generator are weighted for purposes of the optimization based upon power fractions associated with the internal combustion engine and the electric generator, the power fractions being referenced to a total power released by the internal combustion engine.

13. A drive system as defined in claim 12, wherein the control device optimizes the total efficiency by considering an efficiency of the drive train of the vehicle.

14. A drive system as defined in claim 12, wherein a fixed speed ratio prevails between the internal combustion engine and the electric generator at least during efficiency optimization.

15. A drive system as defined in claim 14, wherein the fixed speed ratio has a value of approximately 1.

16. A drive system as defined in claim 12, wherein a speed ratio between the internal combustion engine and the electric generator is variable in one of continuous and finely graded fashion, and the control device selects the speed ratio within a range of possible ratio values so that the highest possible total efficiency is achieved.

17. A drive system as defined in claim 12 wherein the control device considers a change in total power resulting from optimization of the total efficiency by iteratively evaluating the optimal total efficiency and the desired total power.

* * * * *